UNITED STATES PATENT OFFICE.

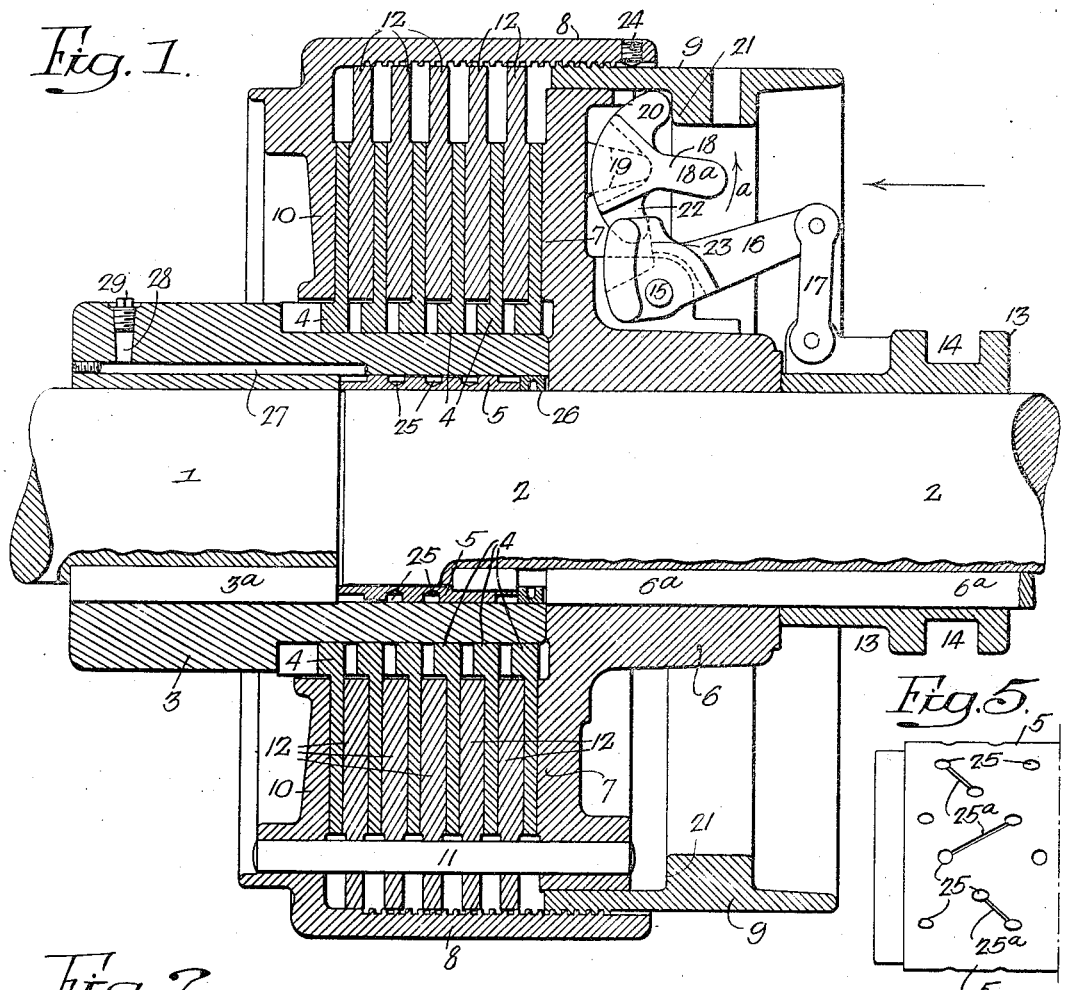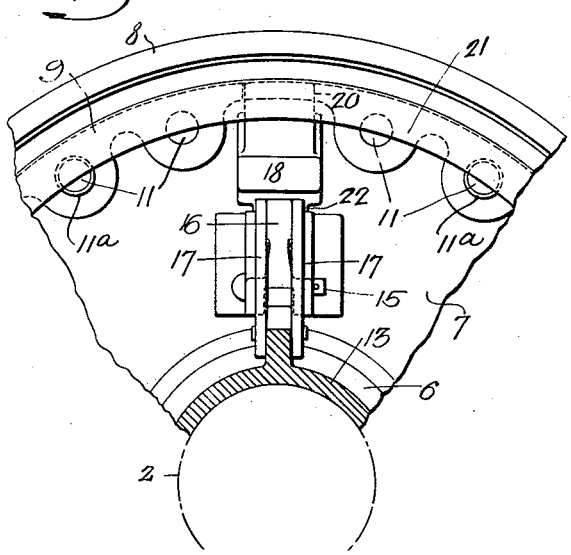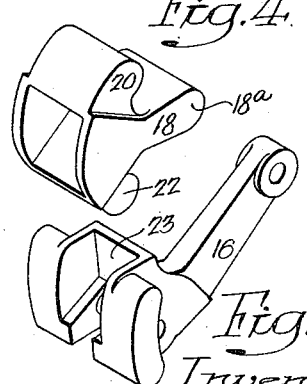

JOSEPH A. WHITE, OF PHILADELPHIA, PENNSYLVANIA, ASSIGNOR TO THE MOORE AND WHITE COMPANY, OF PHILADELPHIA, PENNSYLVANIA, A CORPORATION OF PENNSYLVANIA.

FRICTION-CLUTCH.

1,272,745. Specification of Letters Patent. Patented July 16, 1918.

Application filed December 29, 1916. Serial No. 139,552.

*To all whom it may concern:*

Be it known that I, JOSEPH A. WHITE, a citizen of the United States, residing in Philadelphia, Pennsylvania, have invented certain Improvements in Friction-Clutches, of which the following is a specification.

The object of my invention is to improve the construction of friction clutches of the disk type, which are adapted for use in connection with high speed drives so as to counterbalance the operating levers and links which have a tendency to move outward due to the action of centrifugal force.

Figure 1 is a longitudinal sectional view of my improved friction clutch showing two shafts broken away;

Fig. 2 is a view looking in the direction of the arrow, Fig. 1, of a portion of the clutch;

Fig. 3 is a perspective view of the lever for moving the clutch elements;

Fig. 4 is a view of one of the levers; and

Fig. 5 is a detached view of part of the bushing.

Referring to the drawings, 1 and 2 are two shafts, forming two elements in the present instance, to be coupled together. The shaft 1 is secured to the hub 3 by a key $3^a$ and mounted on this hub are friction disks 4 spaced apart, as shown. These disks are free to slide longitudinally on the hub, but must turn therewith. The hub 3 extends beyond the end of the shaft 1 and has its bearings on a bushing 5 keyed to the end of the shaft 2. 6 is a hub arranged to slide on but turn with the shaft 2. A key $6^a$ extends through a slot in the shaft and in the hub as clearly shown in Fig. 1. The hub has an integral disk face 7 in alinement with the disks 4 carried by the hub 3. 8 is a casing having an internal flange 10 at the opposite end of the shell in alinement with the disk face 7 of the hub 6 and alining with the disks 4 are disks 12 arranged to slide in and turn with the casing 8. The casing has an internal screw thread and adapted to this thread is a shell 9 which incloses the operating mechanism. The shell is held in the adjusted position by a set screw 24 and is mounted on the flange 7 of the hub 6. Pins 11 extend through the flange 7 and the several disks 12 and the casing 8 so that the disks and casing must turn with the hub 6.

When the several disks are forced together, as shown in Fig. 1, then the shafts 1 and 2 are coupled together. In the present instance, 1 is preferably the driving shaft and 2 is the driven shaft. Springs $11^a$ are mounted on the pins 11 and between the disk 7 and the flange 10 so as to separate these two elements when the pressure is released. This construction is common to this type of clutch.

13 is a shifting collar keyed to the shaft 2 so that it will turn with the shaft, but is free to slide thereon. This collar has a groove 14 for a shifting lever, not shown. Pivoted at 15 to lugs on the hub 6 are levers 16, which are connected to the shifting collar 13 by links 17. I preferably use three or more of these levers and links, depending considerably upon the size of the clutch. When the collar 13 is in the position shown in Fig. 1, the disks 4 and 12 are clamped together and when the collar 13 is moved away from the hub 6, the hub is retracted so as to release the disks and one set of disks will turn independently of the other. These clutches are used particularly for high speed drives so that the tendency of the levers 16 and the links 17 is to move outward, due to centrifugal force. This makes the clutch rather difficult to operate as the resistance, due to centrifugal force, must first be overcome before the collar 13 can be moved.

In order to counterbalance the action of centrifugal force, I provide a rocking weight 18 for each lever. This rocking weight is mounted on a stud 19 projecting from the disk face 7, as shown in Fig. 1, and each weight has a projecting portion 20 which rests against an internal flange 21 on the shell 9 and has another projecting portion 22 which enters a recess in the short arm of the lever 16 and bears against the face 23 of said lever. The weight has an arm $18^a$ which acts as a counterbalance for the lever and link to which it is connected. The arm $18^a$ is made integral with the weight and when the parts are assembled it can be diminished in length or the length can be increased by adding metal to it so that it will properly counterbalance the parts. The weight 18 bears against the inner surface of the shell 9 and as the clutch rotates the arm $18^a$ is thrown outward in the direction of the arrow *a*. This action tends to counterbalance the outward movement of the levers 16 and the links 17 so that the collar 13 will remain in the position in which it is adjusted and will not creep on the shaft as heretofore.

In order to properly lubricate the bearing between the hub 3 and the end of the shell 9, I provide a bushing 5 as described, which is keyed to the shaft 2 and has a number of cavities 25 therein connected together by shallow grooves 25ª, Fig. 5. Between this bushing and the hub 6 is an oil ring 26, which tends to prevent the lubricant from passing the ring. 27 is a longitudinal channel extending from the outer end of the hub 3 and past the end of the shaft 1 and communicates with a narrow groove in the bushing 5. This passage 27 is closed at the outer end by a plug. Extending at right angles from this passage is a passage 28 closed by a headed screw plug 29. On removing this plug oil, or other lubricant, can be admitted to the passage 27 and this will flow to the several connected recesses 25 in the bushing 5. Then the plug 29 is reinserted and the lubricant thus applied will last for a considerable time without renewal. This dispenses with all oil cups, which are objectionable when used in connection with rapidly revolving elements.

I claim:

1. The combination in a disk friction clutch, of a driving and a driven element; two series of disks, the disks of the two series being alternately arranged, one series of disks being connected to one element and the other series of disks being connected to the other element; a sliding hub forming part of one element; a sliding collar; lever mechanism connected with the collar for causing the sliding hub to clamp the several clutch disks together so that one element will be driven through the disks by the other element; and a separate counterbalance weight for counterbalancing the movement of the levers, due to centrifugal force.

2. The combination in a disk friction clutch, of two elements; a hub on one element; a series of disks connected with the hub; a sliding hub on the other element; a casing connected to the sliding hub; a series of disks attached to the casing and alternating with the disks on the first mentioned hub; a series of levers, each lever having a long arm, said levers being pivoted to the sliding hub; a collar; links connecting the levers with the collar; and a rocking counterbalance weight for each lever mounted on the sliding hub and arranged to counteract the tendency of the long arm of each lever and its link to move outward, due to centrifugal force.

3. The combination in a friction clutch, of two shafts; a hub fixed to one shaft; disks carried by the said hub; a sliding hub on the other shaft; disks also carried by the said hub and alternating with the other disks; a casing inclosing the disks and attached to the sliding hub; a shell secured to the casing and having an internal flange; a sliding collar; a series of levers pivoted to the sliding hub; a link connecting the long arm of each lever with the collar; studs projecting from the face of the sliding hub; a rocking weight mounted on each stud, one end of the weight bearing against the inner surface of the shell and also against the flange on the shell, the other end of the weight bearing against a surface on the short arm of the lever so as to counteract the tendency of the long arm of the lever and its link to move outward due to centrifugal force.

4. The combination of a friction clutch; two shafts; two series of disks; a hub on each shaft, one hub carrying one set of disks, the other carrying the other set of disks, one of said hubs being movable; a casing connected to said movable hub; a shifting collar; levers and links coupling the collar to the movable hub; and a rocking counterbalance weight for each lever, said weight having an arm and having two bearing portions, one coming in contact with the lever and the other with a portion of the casing connected to the sliding hub.

5. The combination in a disk friction clutch, of two elements; a hub on each element, one of said hubs being movable; a casing to which the movable hub is connected; two series of disks alternately arranged, one series being connected to one hub and the other series being connected to the other hub through the casing; a lever for clamping the disks, said lever having a short arm and a long arm; a shell secured to the casing and extending over the lever; an internal flange on the shell; and a rocking counterbalance weight mounted on the movable hub and having two bearing portions, one bearing portion resting against the shell and the internal flange thereon, the other portion bearing against the short arm of the lever.

JOSEPH A. WHITE.